United States Patent
Hubble, III et al.

[11] Patent Number: 5,526,190
[45] Date of Patent: Jun. 11, 1996

[54] OPTICAL ELEMENT AND DEVICE FOR PROVIDING UNIFORM IRRADIANCE OF A SURFACE

[75] Inventors: Fred F. Hubble, III; James P. Martin, both of Rochester, N.Y.

[73] Assignee: Xerox Corporation, Stamford, Conn.

[21] Appl. No.: 314,750

[22] Filed: Sep. 29, 1994

[51] Int. Cl.$^6$ .............................. G02B 3/02; G02B 13/18
[52] U.S. Cl. ...................... 359/719; 359/708; 359/710; 359/718
[58] Field of Search ...................... 359/708, 710, 359/718, 719, 720

[56] References Cited

U.S. PATENT DOCUMENTS

| | | | |
|---|---|---|---|
| 2,215,900 | 9/1940 | Bitner | 359/718 |
| 2,224,178 | 12/1940 | Bitner | 359/718 |
| 2,254,961 | 9/1941 | Harris | 359/718 |
| 2,254,962 | 9/1941 | Harris et al. | 359/718 |
| 4,255,042 | 3/1981 | Armitage, Jr. et al. | 355/3 R |
| 4,734,839 | 3/1988 | Negishi | 359/708 |
| 4,767,172 | 8/1988 | Nichols et al. | 350/96.18 |
| 4,770,514 | 9/1988 | Silverglate | 359/708 |

*Primary Examiner*—Georgia Y. Epps
*Assistant Examiner*—Michael A. Papalas
*Attorney, Agent, or Firm*—R. Hutter

[57] ABSTRACT

An optical element uniformly distributes radiant energy on a target surface, such as for discharging an area of a photoreceptor in a xerographic printer, or for applying infrared energy to dry an ink-jet image. A cylinder lens collimates light beams from a light source and directs the collimated light beams to a preselected area on the target surface. First and second refractive portions, each attached to and extending parallel to the cylinder lens, totally internally reflect light beams from the light source and direct the light beams reflected therein to the target surface.

7 Claims, 2 Drawing Sheets

OPTICAL ELEMENT AND DEVICE FOR PROVIDING UNIFORM IRRADIANCE OF A SURFACE

The present application incorporates by reference U.S. Pat. No. 4,767,172, assigned to the assignee hereof.

The present invention relates to an optical element for directing light to a small linear area on a target surface, such as would be used as an "erase bar" to discharge selected areas on a charge-retentive photosensitive surface, such as the photoreceptor in an electrophotographic printer.

In electrophotographic or electrostatographic printing, also familiarly known as xerography, a charge-retentive, photosensitive surface, typically known as a "photoreceptor," is initially charged uniformly. In an exposure step, the light from an image, either an original image focused on the photoreceptor or an image created by the action of digital image data modulating a scanning laser, selectably discharges specific areas in the surface. This exposure creates a latent image of charged and discharged areas representative of the image desired to be printed. In a development step, fine dry-ink particles known as "toner" are applied to the latent image. The toner particles adhere electrostatically only to those areas on the photoreceptor on which an electrostatic charge remains. This developed image on the photoreceptor, having toner adhering to the print-black portions of the image, is then transferred to a print sheet on which the desired print or copy is fixed.

In high-speed or high-volume xerographic equipment, the photoreceptor is typically in the form of a relatively long belt on which as many as ten or more separate page images, or "pitches," may be created in sequence. There are typically small spaces along the photoreceptor belt edge, known as the "inboard and outboard edges," and also between the images developed thereon, known as "interdocument zones," on which no image is exposed as the belt passes through the various steps of the xerographic process. Because these interdocument and edge zones are not exposed to an image, the original charge in these zones remains throughout the printing process; consequently, unwanted toner will adhere to these zones in the development step. This excess toner on the photoreceptor, which is not used to create any image, presents a practical problem in high-speed copiers and printers, in that the toner adhering to these interdocument zones is simply "loose" in the machine and can only interfere with proper operation of the machine. It is therefore desirable to discharge these narrow interdocument zones between pitches and along the edges on a photoreceptor belt.

One common method of avoiding the accumulation of toner particles in these zones is to remove the charge from the zones. Because the photoreceptor is photosensitive, this charge can be removed by exposing the two zones to light which will discharge the photoreceptor in those zones. In particular, for creating a small band of light that can be briefly flashed onto an interdocument zone, there is known in the prior art the concept of the "erase bar." Conventionally, erase bars have been incandescent or fluorescent lamps in which the lamp illumination has been attenuated by shields to the photoconductor to obtain sharp edge delineation of the erased area in the introdocument zone so that the light from the erase bar will not interfere with actual images being created on the photoreceptor. A disadvantage of this approach is that only a portion of the light is employed in discharging the photoreceptor. The portions that are attenuated by the shields are not used and are therefore wasted. An ideal erase bar would be capable of selectably discharging the narrow band on the photoreceptor which is the interdocument zone, without "spilling" light therefrom into the adjacent image zones, where the light would interfere with the discharged areas of actual latent images. Additionally, an ideal erase bar would be efficient and direct substantially all of its light against the photoreceptor in a narrow band, with no unwanted stray light that requires attenuation in order to employ fewer light sources. It is therefore desirable that a light bar be able to direct light beams so that they are substantially normal to the surface of the photoreceptor.

Among light sources for use in erase bars, the most preferred is the light-emitting diode, or LED. Typically, these LEDs can be created very inexpensively on a gallium arsenide or gallium arsenide-phosphide substrate in a 10 mil×10 mil square die. When lit, the die creates light that emanates from an area that is generally small when compared to the dimensions of thier optic elements and thus creates a near point-source form. It is therefore desirable that an erase bar be able to take the light from a series of small point-source LEDs and direct the beams therefrom so that the beams are substantially parallel to each other and appear to be emanating from a single linear light source.

U.S. Pat. No. 4,255,042 discloses the use of an LED as an erase bar. In this patent, it is taught to provide a light channel, in the form of an optical wave guide, having one end next to an array of discrete LEDs. Light is emitted from the LEDs into the light channels and internally reflected and propagated to the photoreceptor.

U.S. Pat. No. 4,767,172, assigned to the assignee hereof and incorporated herein by reference, discloses a collector for an LED array, wherein each point source LED is provided with a radially-symmetric collector, including a convex lens portion and a parabolic reflecting surface portion. Light exiting substantially perpendicular to the substrate on which the LED is mounted is applied to the convex lens and collimated, while light exiting substantially parallel to the substrate on which the LED is mounted strikes a parabolic reflecting surface at greater than a critical angle thereof, and is also collimated, resulting in two concentric collimated beams. These beams are combined and applied to a light pipe which mixes the beams and directs the light onto a photoreceptor.

Also in the prior art, there have been shown other devices for converting the light from a series of LED point sources into what is desired to appear to be a uniform linear light source. One design, which is provided in equipment made in Japan under the trade name "Stanley," involves encapsulating a series of LED point sources in a transparent plastic material a portion of which is formed into a simple cylinder lens. Light from the LEDs is refracted through the transparent plastic material, and a portion thereof is emitted in substantially collimated fashion through the cylinder lens portion. Another known technique is to provide a linear array of LEDs, and enclose each LED in a substantially cubic-shaped reflective enclosure, with one face of the cube open for the emission of light therefrom. The erase bar is thus in the form of a line of small adjoining cubic-shaped reflectors.

According to one aspect of the present invention, there is provided an optical element adapted to be interposed between a light source and a target surface. A cylinder lens collimates light beams from the light source and directs the collimated light beams to a preselected area on the target surface. First and second refractive portions, each attached to and extending parallel to the cylinder lens, totally internally reflect light beams from the light source and direct the light beams reflected therein to the target surface.

According to another aspect of the present invention, there is provided an apparatus for irradiating a target surface, comprising a light source, a cylinder lens adapted to collimate light beams from the light source and direct the collimated light beams to a preselected area on the target surface, and first and second refractive portions. Each refractive portion extends parallel to the cylinder lens, and is adapted to totally internally reflect light beams from the light source and direct the light beams reflected therein to the target surface.

Figure 1:
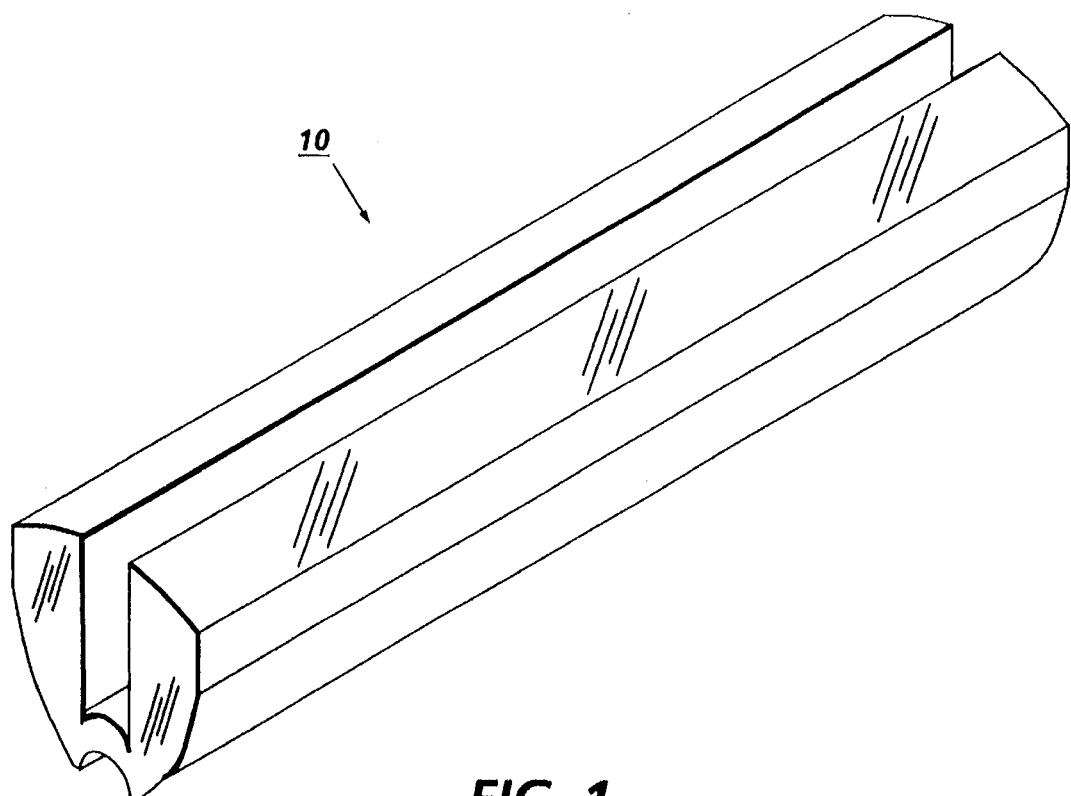
FIG. 1 is a perspective view of an optical element according to the present invention.
Figure 2:
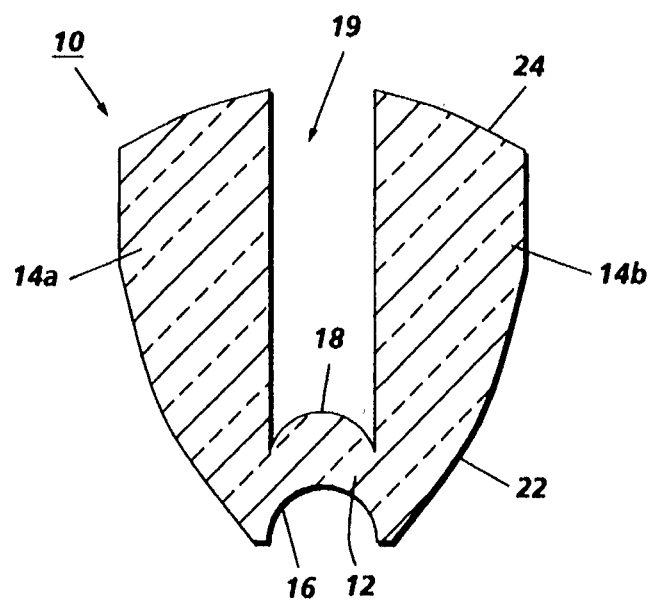
FIG. 2 is a sectional elevational view through an optical element according to the present invention.

FIGS. 1 and FIG. 2 are perspective and sectional elevational views, respectively, of an optical element according to the present invention. The optical element, generally indicated as 10, is in the form of an elongated, light-transmissive single member which is shaped and sized to extend across a typical width of a photoreceptor belt, such as 11 to 14 inches, and is also wide enough to apply light transmitted therethrough to a typical-sized interdocument zone, which is typically on the order of 30 millimeters in width. The optical element 10 is preferably made of glass or any appropriate transparent plastic material such as styrene, acrylic or polycarbonate.

FIG. 2 is an end-on or sectional view of the optical element 10. It will be apparent that the profile of the optical element shown in FIG. 2 is intended to be constant throughout the effective length of the optical element 10. The particular optical element shape shown in FIG. 2 is specifically designed for light-transmissive materials having a refraction index of approximately 1.5 and for the transmission of light of a wavelength between about 660 to 770 nm; it will be apparent to one of skill in the art that the specific shapes of the surfaces of optical element 10 will have to be adapted slightly for materials of different refraction indices and for different expected light sources. The basic portions of the optical element 10 can be seen in FIG. 2 as a central concave-convex cylinder lens 12 forming a central portion of the optical element 10. As used in the specification and claims herein, the term "cylinder lens" shall mean any optical element extending in a direction and having a constant lens profile throughout the length thereof; the cylinder lens need not be in the form of a cylinder or a portion of a cylinder. Attached to either side of cylinder lens 12 are light-transmissive refractive portions indicated as 14a and 14b. As can be seen, both cylinder lens 12 and refractive portions 14a and 14b may be molded from a single member of light-transmissive materials. An optical element 10 of a desired length could also conceivably be created by butting small sections (e.g. 1–2 inches in length) having the requisite profile into a single effective optical element.

In the preferred embodiment of the optical element of the present invention, cylinder lens 12 includes a concave surface 16 and a convex surface 18. Each refractive portion 14a or 14b includes a total internal reflection (TIR) surface 22 and an exit surface 24. The two refractive portions 14a, 14b define between them a channel, indicated as 19, which is adjacent the convex surface 18 of cylinder lens 12. (Because the refractive portions 14a, 14b in the specification herein are employed for their total internal reflection properties, the claims hereinbelow refer to "reflective portions.")

Figure 3:
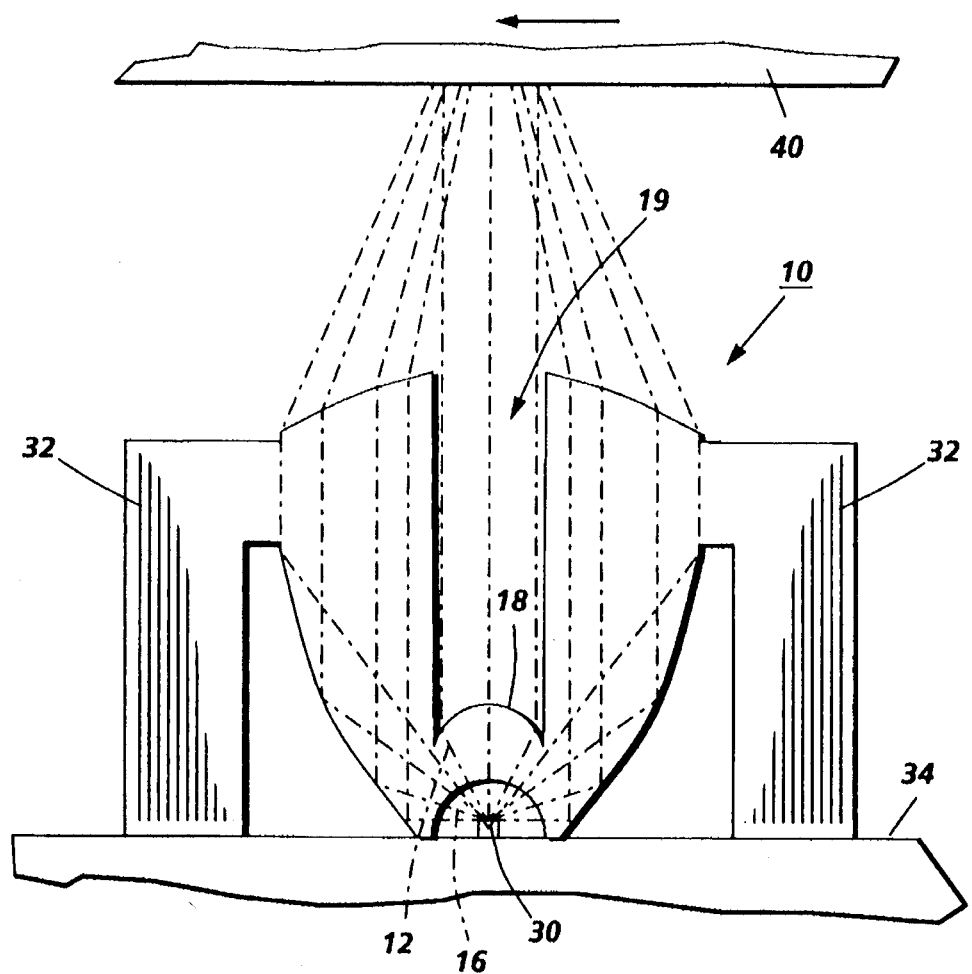
FIG. 3 is another sectional view through the optical element of the present invention, showing the behavior of light beams from a point source interacting with the optical element.

FIG. 3 is another sectional view through the optical element 10 of the present invention showing behavior of light beams emitted from a point source 30, mounted on a substrate 32, as they interact with the optical element 10. As a practical embodiment of an erase bar using the optical element of the present invention, a linear array of such LEDs 30 are mounted on a flat surface such as 34. The particular embodiment of the optical element in FIG. 3 includes mounting portions 32 which are intended to act as physical supports of the optical element 10; these mounting portions 32 can be integrally molded into the single member. One LED 30 of the linear array emits light as a point source, with a set of beams being emitted essentially in all directions therefrom. It will be noted in FIG. 3 that the beams emitted from LED 20 are intended to be directed to a target surface 40, which may be, for example, an interdocument zone of a moving photoreceptor in an electrophotographic printer.

Light beams emanating from LED 30 from normal to the substrate 34 to around 45° to the substrate 34 first traverse the air within the convex surface 16 of cylinder lens 12, where they enter lens 12 at convex surface 16. Those beams passing through the cylinder lens 12 are refracted again at the convex surface 18 of cylinder lens 12, with the total effect of the beams passing through the cylinder lens 12 being collimated or redirected to be substantially parallel, and directed through the air in channel 19 to the target surface 40. Because of the collimation caused by concave-convex cylinder lens 12, the beams passing therethrough strike the surface 40 substantially perpendicular thereto, as shown. In the preferred embodiment, surface 16 is a cylinder lens of circular cross section with the center of curvature centered on the linear array of LED die, and the flux passing from the air gap surrounding the LED array into the transparent lens media passes through surface substantially unrefracted. However it will be appreciated to those skilled in the art that surface 16 could also be configured to beneficially refract the flux.

Those beams emanating from source 30 which are not properly positioned to be "captured" and thus collimated by cylinder lens 12 instead hit one of the refractive portions 14a or 14b of element 10. These beams exit the LED die substantially parallel to the substrate 34, lying from an angle of 45° to the substrate 34 to parallel to it. The beams strike the TIR surface 22 of one of the refractive portions 14a, 14b and are directed "upward" as shown in FIG. 3. If the angle of incidence of a beam emanating from LED 30 against the interior surface 22 is less than the critical angle of the light transmissive material of which the refractive portion 14 is made, then there will be total internal reflection of the beam at the interior surface 22 and the beams will be reflected toward the target surface 40, as shown in FIG. 3. For an acrylic substance having a refractive index of approximately 1.48 for light of 660–770 nm wavelength, the critical angle at which total internal reflection is possible is approximately 47°, and the TIR surface 22 must be shaped and positioned relative to LED 30 accordingly. Because refractive portions 14a, 14b rely on total internal reflection, no additional reflective surfaces or structures, such as metallization, are required.

The beams which are reflected by total internal reflection from TIR surface 22 pass through the body of each refractive portion 14a, 14b and, in a preferred embodiment of the invention, also pass through an exit surface 24. Exit surface 24 is shaped and positioned to refract the beams passing through the refractive portion 14 and direct them toward the same small area on target surface 40 to which the beams from cylinder lens 12 are directed. As can be seen in FIG. 3, the functions of the cylinder lens 12 and each refractive portion 14a and 14b combine so that almost all of the light emanating from the LED 30 is one way or another directed toward a relatively small predetermined area on target surface 40, thereby irradiating the area. An example of such a small predetermined area on a target surface 40 would be a narrow interdocument zone on a photoreceptor in an electrostatographic printer.

In a preferred embodiment of the present invention, the cylinder lens 12 and refractive portions 14a, 14b are so sized and positioned relative to each other and to each LED 30 that those beams within the sweep from 90° to about 45° relative to a reference surface 34 on which the LED 30 is mounted are captured and collimated by the cylinder lens 12, while the beams in the sweep between 45° and 0° relative to reference surface 34 will be reflected by and transmitted through one of the refractive portions 14a, 14b. In this way, a relatively high proportion of all light emitted from an LED 30 will ultimately be transmitted to the desired small area on target surface 40. More generally, it is desirable that a portion of the light emanating from the light source between 45° and 90° relative to the reference surface be captured by cylinder lens 12, while the light from a least 0° to 45° relative to the reference surface be captured by one of the refractive portions 14a, 14b. The division of light along the 0° to 90° intensity profile of the particular LED between the cylinder lens 12 and a refractive portion 14a, 14b need not be at the 45° angle for all cases, but could exist around other angles, such as 50° or 55°, depending on a specific design of the discharging apparatus or the beam intensity profile of a particular type of LED. (It will be noted that these relationships of light from various angles will exist even if the LED 30 is not in fact mounted on a reference surface 34. Reference surface 34 is shown in FIG. 3 for illustrative purposes only as a representative surface passing through the LED 30, and is not intended to be part of the claimed invention. LED 30 could be mounted, for example, at the end of an elongated member.)

As mentioned above, the most practical type of linear light source for use in a practical erase bar is a linear array of small LED point sources. An erase bar should ideally emit light as though a continuous series of parallel beams of uniform intensity were being emitted from a slit-like linear light source. The practical concern with the series of discrete point sources simulating a single linear source is that the intensity of light flux along the length of the optical element will inevitably be somewhat greater in the areas immediately around each individual point source LED; this unevenness of light intensity along the array will result in uneven discharging along an interdocument zone in an electrostatographic printer. Also very important is the fact that low-cost LEDs are widely variable in light intensity under identical conditions; it is not uncommon, in a batch of newly-manufactured small LEDs, to have a performance variation (i.e., the difference in intensity in light produced by different LEDs in the batch) of as high as 3:1. It would be desirable to use these low-cost LEDs in a manner so that a manufacturer buying a large quantity of inexpensive LEDs would not have to be concerned with wide variations in intensity among individual LEDs.

Figure 4:
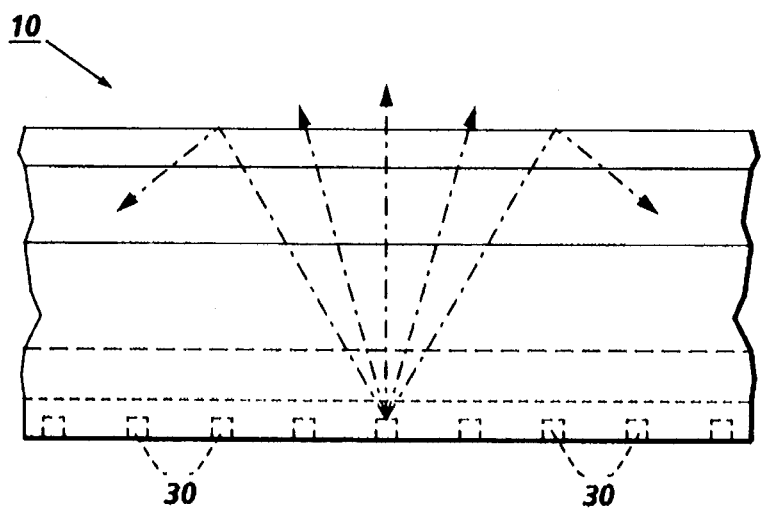
FIG. 4 is an elevational view, orthogonal to the view of FIG. 2, of the optical element of the present invention, in combination with a series of point light sources arranged in a linear array.

The optical element 10 of the present invention is effective in providing light of satisfactorily uniform intensity along the length thereof, so that discrete point sources in an array along the optical element 10 would not be apparent in the light output. FIG. 4 is an elevational view of the optical element 10 of the present invention, in combination with a series of LED point sources 30. It will be seen that the optical element 10 also functions as a light pipe for the distribution of light along the length thereof, wherein the light emitted from each individual point source LED 30 may be distributed widely along the length of the optical element 10. Because of this wide distribution along the length of the optical element 10, light from various point source LEDs 30 is well mixed and the intensity of light flux along the length of the optical element 10 is substantially uniform.

Another utility of the present invention is in a device for applying energy to a print sheet, such as created by an ink-jet printer, in order to dry the ink thereon. In such a case the light sources 30 would preferably be adapted to emit light in infrared wavelengths, and the curvatures of the various surfaces of the optical element 10 would be adjusted accordingly. The optical element of the present invention could then be used to direct infrared light from a series of point sources evenly onto a concentrated area of a print sheet being moved therepast.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. An optical element adapted to be interposed between a light source and a target surface, comprising:

a meniscus cylinder lens adapted to collimate light beams from the light source and direct the collimated light beams to a preselected area on the target surface; and first and second reflective portions, each reflective portion attached to and extending parallel to the meniscus cylinder lens, each reflective portion adapted to totally internally reflect light beams from the light source and direct the light beams reflected therein to the preselected area on the target surface, whereby the reflected light beams from the reflective portions are not parallel to the collimated light beams from the menisicus cylinder lens.

2. The optical element of claim 1, each reflective portion further defining an exit surface, each exit surface adapted to direct the light beams reflected in the reflective portion to the preselected area on the target surface.

3. The optical element of claim 1, further comprising a channel defined therein between the first and second reflective portions.

4. An apparatus for irradiating a target surface, comprising:

a plurality of light-emitting elements acting as point light sources, arranged in a linear array;

a meniscus cylinder lens adapted to collimate light beams from the light elements and direct the collimated light beams to a preselected area on the target surface; and first and second reflective portions, each reflective portion attached to and extending parallel to the meniscus cylinder lens, each reflective portion adapted to totally internally reflect light beams from the light sources and direct the light beams reflected therein to the preselected area on the target surface, whereby the reflected light beams from the reflective portions are not parallel to the collimated light beams from the menisicus cylinder lens.

5. The apparatus of claim 4, each reflective portion further defining an exit surface, each exit surface adapted to direct the light beams reflected in the reflective portion to the preselected area on the target surface.

6. The apparatus of claim 4, wherein light beams emitted from each light source between 0° and at least 45° relative to a reference surface, the reference surface passing through the plurality of light sources, are totally internally reflected in a reflective portion.

7. The apparatus of claim 6, wherein at least a portion of light beams emitted from each light source between 90° and 45° relative to the reference surface are collimated by the meniscus cylinder lens.

* * * * *